United States Patent [19]

Shioyama et al.

[11] 4,117,519
[45] Sep. 26, 1978

[54] GUIDE DRUM APPARATUS IN A MAGNETIC RECORDING AND/OR REPRODUCING APPARATUS

[75] Inventors: Tadao Shioyama, Katano; Minoru Koda, Hirakata, both of Japan

[73] Assignee: Matsushita Electric Industrial Co., Ltd., Osaka, Japan

[21] Appl. No.: 846,491

[22] Filed: Oct. 27, 1977

[30] Foreign Application Priority Data

Oct. 27, 1976 [JP] Japan .................. 51-129665

[51] Int. Cl.² .................. G11B 21/04; G11B 21/18; G11B 5/45
[52] U.S. Cl. .................. 360/84; 310/268
[58] Field of Search .................. 360/84, 129–130, 360/107, 128; 310/268, 209, 181, 66, 67 R, 74, DIG. 4

[56] References Cited

U.S. PATENT DOCUMENTS

| | | | |
|---|---|---|---|
| 3,435,154 | 3/1969 | Kihara | 360/130 |
| 3,666,894 | 5/1972 | Prochnow | 360/84 |
| 4,030,133 | 6/1977 | Yamada et al. | 360/130 |
| 4,072,874 | 2/1978 | Arnold | 310/268 |

*Primary Examiner*—Alfred H. Eddleman
*Attorney, Agent, or Firm*—Wenderoth, Lind & Ponack

[57] ABSTRACT

A guide drum apparatus includes: a stator plate having armature windings fixedly mounted on a surface thereof perpendicular to the axis of a center shaft. Rotary magnets are fixedly supported by the center shaft on a plane perpendicular to the axis of the center shaft and face the armature windings so that the magnetic fluxes from the armature windings cause the rotary magnets to rotate according to the operational principle of a brushless d.c. motor. A stationary hollow cylindrical drum coaxially and rotatably mounts the center shaft. A rotary hollow cylindrical drum coaxially and fixedly mounted on the center shaft and has a rotary head fixedly mounted at an outer peripheral surface thereof. The outer surfaces of the stationary and the rotary drums are arranged on the same cylindrical surface to form a magnetic tape guiding surface, and the hollows of the stationary and the rotary drums form a contiguous bore containing all of the rotary magnets, the armature windings and a rotary transformer therein. This guide drum apparatus can be made compact in size and yet can smoothly rotate the rotary head without disturbing the signals on the magnetic tape.

12 Claims, 11 Drawing Figures

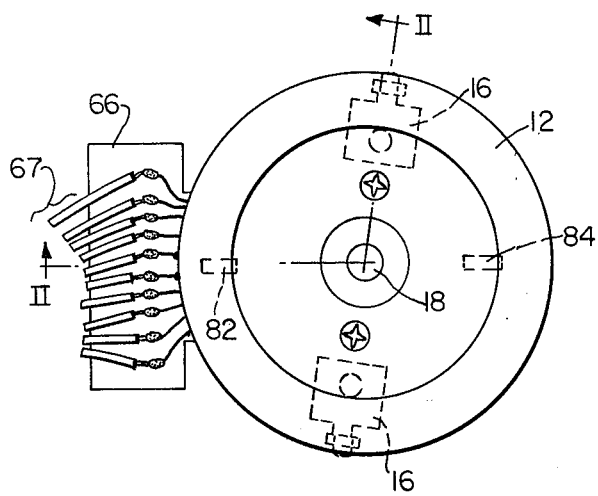
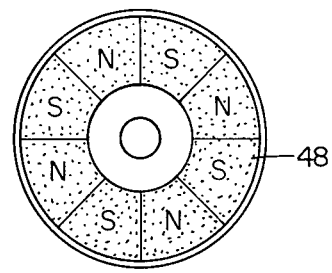
FIG. 1
FIG. 3
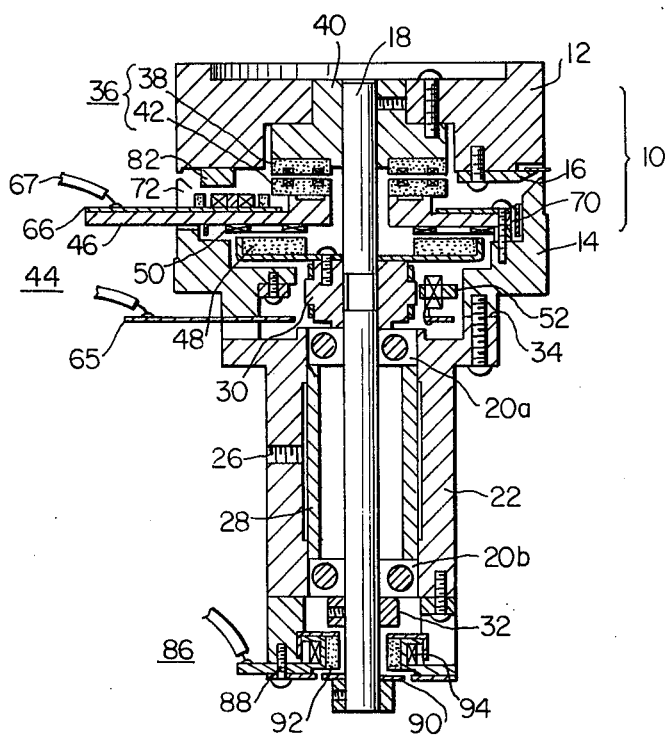
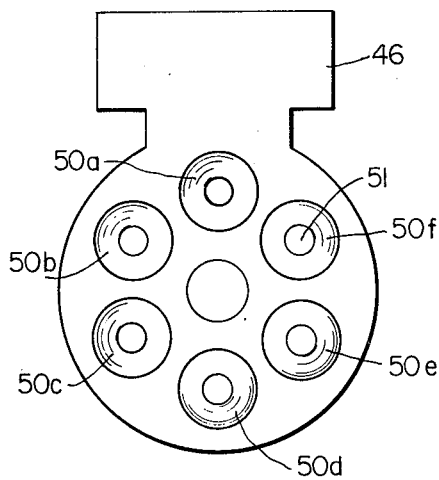
FIG. 2
FIG. 4

GUIDE DRUM APPARATUS IN A MAGNETIC RECORDING AND/OR REPRODUCING APPARATUS

BACKGROUND OF THE INVENTION

This invention relates to a guide drum apparatus in a magnetic recording and/or reproducing apparatus, more particulary in a video tape recorder.

It is known that in a rotary head type video tape recorder, a rotary head rotating at a high speed records video signals onto and reproduces the same from a running magnetic tape. In order to obtain a stable video image reproduced from recorded video signals, it is required to rotate the rotary magnetic head very smoothly and stably.

However, according to a conventional guide drum apparatus using a d.c. motor with a brush or an a.c. motor, in which the rotational force of the motor is indirectly transferred to the guide drum via a belt, a very smooth and stable rotation of the guide drum cannot be achieved, due e.g. to the poor rotational performance of the motor itself and to the vibration of the belt and/or eccentricity of a pulley.

For overcoming such problems, a directly driven guide drum apparatus has been suggested, in which a common center shaft is used for the motor and the guide drum. Further, a guide drum driven by a brushless motor has been suggested. However, these suggested guide drum arrangements have disadvantages that the leakage fluxes from a rotor of a permanent magnet cause undesired magnetic coupling, i.e. they badly affect the signals recorded on the magnetic tape. For preventing such leakage fluxes, many magnetic shield plates are necessary. Further, the elements used for the motor and the elements used for the guide drum apparatus occupy a considerable space to cause the total apparatus to become big in size. Also, many printed circuit boards are necessary for providing electrical wiring to the many elements in the motor and the guide drum.

Furthermore, for achieving rotational position detection in a brushless motor, a high frequency signal such as several tens kHz is necessarily used, but this high frequency signal is likely to influence the signals in a rotary transformer and the rotary head.

SUMMARY OF THE INVENTION

Accordingly, it is an object of this invention to provide a guide drum apparatus directly driven by a motor, which apparatus has compact total size and can rotate very smoothly and stably without disturbing the signals on the magnetic tape.

This object is achieved according to this invention by providing a guide drum apparatus in a magnetic recording and/or reproducing apparatus, comprising: a rotary center shaft; a hollow cylindrical rotary drum coaxially fixed to the center shaft and having a cylindrical outer surface; a rotary head fixedly supported by the center shaft at a hollow cylindrical outer surface of the rotary drum; a hollow cylindrical stationary drum coaxially and rotatably supporting the center shaft and having a cylindrical outer surface, the cylindrical outer surfaces of the rotary drum and the stationary drum being positioned on the same cylindrical surface and spaced from each other by a gap, at which the rotary head is positioned, and the hollows of the rotary drum and the stationary drum facing each other to thereby form a bore; a stator plate of a magnetic material fixed to the stationary drum and having a major plane surface perpendicular to the axis of the center shaft; stationary armature windings fixed to the major plane surface of the stator plate and equidistantly positioned on a circle defined on the stator plate, the center of the circle coinciding with the axis of the center shaft; a rotary winding, for a rotary transformer, fixedly supported by the center shaft at a side facing a surface of the stator plate opposite to the major plane surface of the stator plate, and electrically connected to the rotary head; a stationary winding, for the rotary transformer, fixedly supported by the stationary drum at a position between the rotary winding and the surface of the stator plate opposite to the major plane surface of the stator plate, the stator plate thus functioning also as a shield plate for reducing the magnetic coupling between the rotary transformer and the armature windings and also between the rotary head and the armature windings; and rotary magnets fixedly supported by the center shaft and equidistantly spaced on a circle which is defined on a plane parallel to and facing the major plane surface of the stator plate and which has a center coinciding with the axis of the center shaft, so that the armature windings face the rotary magnets to cause the rotary magnets to rotate by the magnetic fluxes produced from the armature windings, wherein all of the rotary transformer, the armature windings and the rotary magnets are contained in the bore.

According to this invention, the space or bore defined by the rotary and the stationary guide drums is effectively used for the elements of the motor, and possible undesired magnetic coupling can be prevented mainly by the stator plate, so that the total size of the guide drum apparatus can be made small substantially without disturbing the signals on the magnetic tape. Further, by mounting the magnets on the rotary center shaft and armature windings on the stator plate, the motor system in the guide drum apparatus can effectively be a brushless motor.

According to a further development of this invention, the stator plate is effectively used for mounting thereon a sensing element for sensing the rotational angle or phase of the rotary drum. According to the guide apparatus of this invention, the electrical wiring to be provided to the various electrical elements in the apparatus can be achieved by using a minimum number of printed circuit boards such as only two of such boards.

BRIEF DESCRIPTION OF THE DRAWINGS

This invention will be described in detail with the aid of the accompanying drawings, which show a preferred embodiment of this invention, wherein:

FIGS. 1 and 2 are a top plan view and a cross-sectional view, respectively, of an example of the guide drum apparatus of this invention, where the cross section of FIG. 2 is taken along the line II—II of FIG. 1;

FIG. 3 is a top plan view of the rotary permanent magnets used in the apparatus of FIG. 2;

FIG. 4 is a bottom plan view of the stator plate with the stationary armature windings used in the apparatus of FIG. 2;

DETAILED DESCRIPTION OF THE INVENTION

Figure 5:
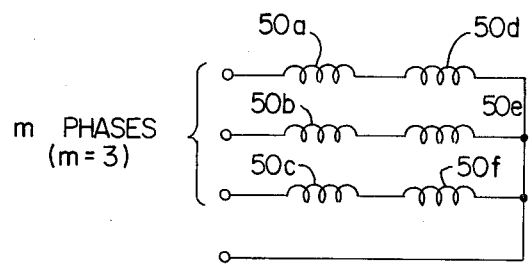
FIG. 5 is a schematic circuit diagram equivalent to the stationary armature windings used in the apparatus of FIG. 2.

In the drawings, like elements are designated by like reference numerals.

Referring to FIGS. 1 and 2, a tape guide member 10 is composed of a cylindrical outer surface of an upper rotary cylindrical hollow drum 12 and a cylindrical outer surface of a lower stationary cylindrical hollow drum 14. The rotary drum 12 rotates together with a rotary head 16. The rotary head 16 is fixed to the rotary drum 12 or the center shaft 18 at a hollow cylindrical outer surface of the rotary drum 12. Actually, there are provided two rotary heads at opposite points at the outer surface of the rotary drum 12, as shown in FIG. 1. The stationary drum 14 is fixed at the end thereof to a cylindrical bearing housing 22 which coaxially and rotatably supports the center shaft 18 therein by a pair of cylindrical ball bearings 20a and 20b. The bearing housing 22 is separable from the tape guide member 10. The pair of ball bearings 20a and 20b fixed to a supporting pipe 28 are fittedly inserted in a cylindrical hollow of a cylindrical wall of the bearing housing 22, and the supporting pipe 28 is fixed by a screw 26.

A cylindrical rotor 30 and a boss 32 are fixed to the center shaft 18, as shown, in a manner such that the bottom surface of rotor 30 and the upper surface of the boss 32 abut on the upper surface of the ball bearing 20a and the bottom surface of the ball bearing 20b, respectively, so as to restrict the vertical position of the bearing housing 22. The cylindrical wall of the bearing housing 22 is fixed by a screw 34 to the stationary drum 14 so that an upper surface of the cylindrical wall of the bearing housing 22 abuts on a bottom surface of the stationary drum 14. The bearing housing 22 is separable from the stationary drum 14 by releasing the screw 34. If the upper surface of the bearing housing 2 which abuts on the bottom surface of the stationary drum 14 is not exactly perpendicular to the rotational axis of the center shaft 18, the resultant guide drum apparatus might not smoothly rotate. Whether or not the upper surface of the bearing housing 22 is perpendicular to the rotational axis of the center shaft 18, can be easily checked by rotating the bearing housing 22 around the center shaft 18 having the bearing housing 22 rotatably mounted thereon. And if the upper surface of the bearing housing 22 is not sufficiently perpendicular, then such error can be easily corrected by machining the upper surface of the bearing housing 22.

A rotary transformer 36 is supported by the rotary and the stationary drums in a manner such that its rotary winding and its stationary winding are positioned on parallel planes, respectively, which face each other a small distance apart and which are perpendicular to the axis of the center shaft. More specifically, a rotary disc plate 40 is positioned in the hollow of the rotary drum 12 and fixed to both the center shaft 18 and the rotary drum 12, as shown. The rotary winding wound on a core 38 of the rotary transformer 36 is fixed on the bottom surface of the rotary disc plate 40. The stationary winding wound on a core 42 of the rotary transformer 36 is fixed by a stator plate 46 which in turn is fixed to the stationary drum 14, so that the rotary winding and the stationary winding face each other to form the rotary transformer 36.

Hereinafter, a brushless d.c. motor 44 will be described. The main portion of the brushless motor 44 comprises: the stator 46, composed of a flat magnetic plate positioned in the hollow of the stationary drum 14 on a plane perpendicular to the axis of the center shaft and supported by stationary drum 14; and a set of rotary magnets 48 equidistantly placed about a circle coaxial with the axis of the center shaft and defined on a plane perpendicular to the axis of the center shaft 18 as shown in FIGS. 2 and 3. The main portion of the stator plate 46 is made of a circular disc which is coaxial with the axis of the center shaft 18 and which has a hole at the center thereof for allowing the center shaft 18 to extend therethrough. The rotary magnets 48, made of permanent magnets having been magnetized in the direction of the plane on which the magnets 48 are placed, have a predetermined number of poles (eight poles in the illustrated embodiment) and are supported by a flat supporting plate. The flat supporting plate is fixedly and coaxially supported by the center shaft 18 in a manner such that the flat supporting plate is fixed to the rotor 30 to cause surface abutment between the bottom surface of the flat supporting plate and the upper surface of the rotor 30.

On the bottom surface of the stator plate 46 which faces the rotary magnets 48, armature windings 50 of a predetermined number (six armature windings 50a to 50f in the illustrated embodiment) are fixed as shown in FIG. 4.

As shown therein, the armature windings 50 are equidistantly placed about a circle coaxial with the axis of the center shaft and defined on a plane perpendicular to the axis of the center shaft, so that the armature windings 50 face the rotary magnets 48. The armature windings 50 are each wound on a core 51 made of a non-magnetic material. Thus, the motor shown here is a slotless brushless motor.

As will be apparent from FIG. 5, the armature windings 50 compose $m$ phases ($m=3$ in the embodiment here). By means of a suitable driving circuit (not shown), a current is switchingly and sequentially applied to the $m$ phase armature windings 50, whereby the magnetic fluxes produced by the armature windings 50 generate magnetic attraction force and magnetic repulsion force between the rotary magnets 48 and the armature windings 50, so that torque is produced to rotate the rotary magnets 48. The rotational position detection for adequately applying a current to the $m$ phase armature windings in the switching and sequential manner is carried out by a position detecting stator 52 having a winding thereon and arranged in the hollow of the stationary drum 14 and a projection 64 provided at an outer peripheral surface of the rotor 30.

Figure 6:
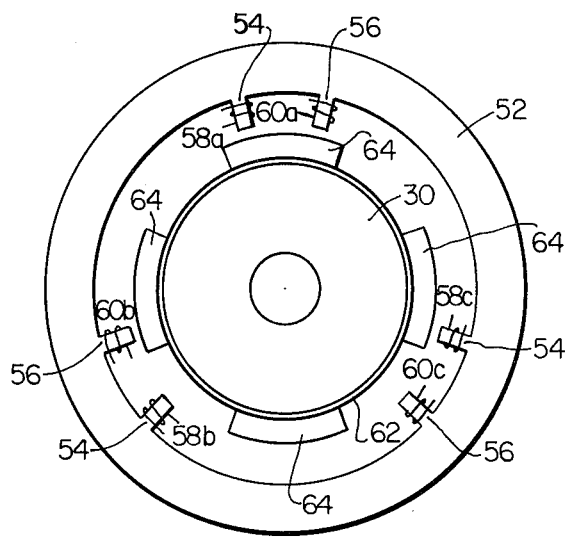
FIG. 6 is a top plan view of a rotational position detecting means used in the apparatus of FIG. 2.
Figure 7:
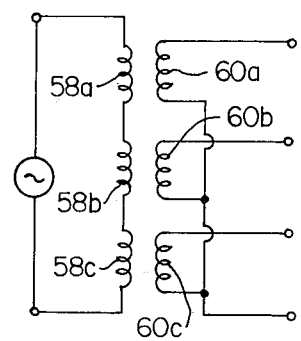
FIG. 7 is a schematic circuit diagram equivalent to the windings wound on the position detecting stators in the rotational position detecting means used in the apparatus of FIG. 2.

The means for carrying out the rotational position detection will be described in detail below with reference to FIG. 6. Referring to FIG. 6, $m$ pairs of primary projections 54 and secondary projections 56 are provided at the inner periphery of the position detecting stator 52 to face the projections 64 provided at the outer periphery of the rotor 30. The primary projections 54 have primary windings 58a to 58c wound thereon, respectively, and the secondary projections 56 have secondary windings 60a to 60c wound thereon, respectively. These windings are connected to form a circuit as shown in FIG. 7. The primary windings 58a to 58c are supplied with high frequency signals so as to magnetically induce signals in the secondary windings 60a to 60c, respectively.

Usually, the primary windings 58a to 58c are supplied with signals of several 10s kHz. Thus, it is harmful to magnetically couple the position detecting stator 52 with the rotary transformer 36 and with the rotary head 16. According to the invention, such harmful magnetic coupling is greatly reduced or prevented by the stator plate 46 which is positioned between the position detecting stator 52 and each of the rotary transformer 36 and the rotary head 16, and which functions as a magnetic shield plate. The stator plate 46 also functions as a shield plate to magnetically separate the armature windings 50 from each of the rotary transformer 36 and the rotary head 16.

Four projections 64 for position detection are equidistantly provided at the outer periphery of the rotor 30 in correspondence with the number of poles of the rotary magnets 48. A short ring 62 of a cylindrical belt form is fittedly mounted on the cylindrical peripheral surface of the rotor 30 and has four openings therein so that the four projections 64 can be inserted in the four openings, respectively. Each of the projections 64 has a width in the peripheral direction so that the projection 64 can simultaneously face both the primary winding 58 and the secondary winding 60 of a pair of primary and secondary windings. Due to such structure, each projection 64 functions to vary the degree of induction coupling between the primary winding 58 and the secondary winding 60. When one pair of primary and secondary windings (e.g. 58a, 60a) simultaneously face one projection 64, such pair might be magnetically coupled with a primary winding of another pair, if the short ring 62 were not provided. Thus, the short ring 62 functions to prevent such undesirable magnetic coupling.

As set forth above, according to the position detection means in the apparatus of the invention, the degree of induction coupling between a primary winding and a secondary winding in a pair thereof varies with the variation of the relative position between the pair and the projections 64 upon the rotation of the projections 64. A maximum signal is induced in the secondary winding when the primary winding and the secondary winding in the pair simultaneously face a projection 64. The driving circuit (not shown) is designed to operate to supply a current to one phase of the armature windings 50 when the maximum signal is induced in the secondary winding. The driving circuit is electrically connected to the secondary windings 60a to 60c through a first printed circuit board 65.

Figure 8:
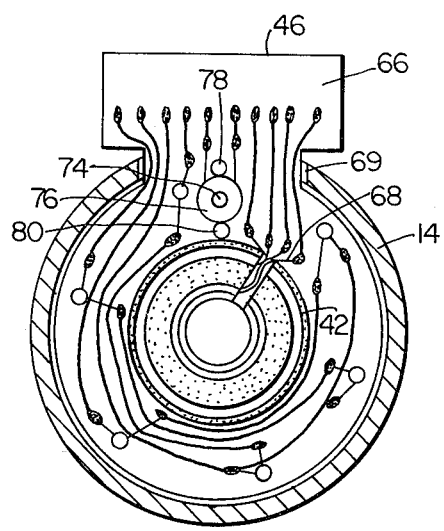
FIG. 8 is a top plan view of the stator plate with various electrical wirings for the stationary armature windings and the stationary winding for the rotary transformer and the rotational position sensing element.

The electrical connection between the armature windings 50 and a driving circuit (not shown) for supplying current to the armature windings is made through a second printed circuit board 66. The circuit pattern of the printed circuit board 66 is provided at a side of the stator plate 46, which is opposite to the surface of the stator plate having the armature windings 50 thereon, and which is on the same side as that where the rotary transformer 36 is provided. The circuit pattern of the printed circuit board 66 is shown in FIG. 8. The printed circuit board 66 also has a circuit pattern to take out electrical signals from a stationary winding 68 wound on a core 42 thereof in the rotary transformer 36. In order to prevent switching noises, produced in the armature windings 50 upon the switching of the current to be supplied to the armature windings 50, from interfering with the signals in the stationary winding 68 in the rotary transformer 36, the printed circuit pattern for the stationary winding 68 is placed remote from the circuit pattern for the armature windings 50 and extends in a direction so as not to form a parallel relation with the circuit pattern for the armature windings 50. For more effectively suppressing the switching noise interference, the end portion of the stationary winding 68 is arranged to extend in the radial direction from the axis of the center shaft as shown in FIG. 8.

In order to easily connect the printed circuit patterns of the second printed circuit board 66 to the driving circuit (not shown) by an electrical lead 67, a cut portion 69 is provided in the stationary drum 14, and the printed circuit board 66 and hence also the stator plate 46 to support the printed circuit board 66 are so designed as to extend outwardly from the stationary drum 14 through the cut portion 69, as is shown in FIG. 8 and as is apparent from FIG. 2.

Figure 9:
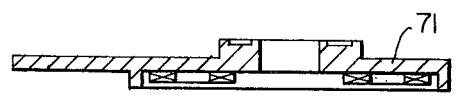
FIG. 9 consisting of A through E is a cross-sectional view of another example of the stator plate with stationary armature windings usable for the apparatus of this invention.

In FIG. 2, reference numeral 70 designates a magnetic shield plate of a ring form which is provided at the inner periphery of the hollow stationary drum 14, and which has a center coinciding with the axis of the center shaft 18. The shield plate 70 is provided for shieldingly interrupting the leakage flux flow from the armature windings 50 in the direction perpendicular to the axis of the center shaft 18. The leakage flux flow from the armature windings 50 in the direction of the center shaft 18 is prevented by the stator plate 46 so that the rotary transformer 36 and the rotary head 16 do not suffer from the leakage flux flow from the armature windings 50. If necessary, the function of the shield plate 70 can be achieved by the stator plate 46 by designing the peripheral end portion of the stator plate to have a ring skirt shaped; as is the shield plate 70. The thus designed stator plate is shown in FIG. 9 by reference numeral 71.

Hereinafter, a rotational phase signal detecting means 72 for detecting the rotational phase or angle of the rotary head 16 will be described. Referring to FIGS. 2 and 8, the rotational phase detecting means 72 comprises a sensing element which is provided on the second printed circuit board 66 and which produces a detecting signal in cooperation with a rotational angle representing element provided on the bottom surface of the rotary drum 12 to face the sensing element. The sensing element comprises a pair of magnets 78, 80 and a sensor winding 76 which is wound on a magnetic core 74 and which is positioned between the pair of magnets 78, 80 in a manner such that all of the magnetic core 74 and the magnets 78, 80 are arranged on a single line extending perpendicularly from the axis of the center shaft 18.

The rotational angle representing element comprises a pair of magnetic plates 82, 84 arranged at sides opposite to each other with respect to the center shaft 18, and placed on a single line extending perpendicular to and passing through the axis of the center shaft 18, as shown in FIG. 1. The pair of magnets 78, 80 face the moving paths of the pair of magnetic plates 82, 84, respectively.

Also, one half of the sensor winding 76 and the other half of the sensor winding 76 face the moving paths of the magnetic plates 82, 84, respectively. The magnets 78, 80 are so placed that the polarities of the magnets 78, 80 are opposite to each other. When the magnetic plates 82, 84 pass over the magnets 78, 80, respectively, two pulses having polarities opposite to each other are produced in the sensor winding 76 because thereupon the magnetic plates 82, 84 change the magnetic flux flowing between the magnets 78, 80. The waveforms of the pulses thus produced in the sensor winding 76 are shown in FIG. 10A.

Figure 10:
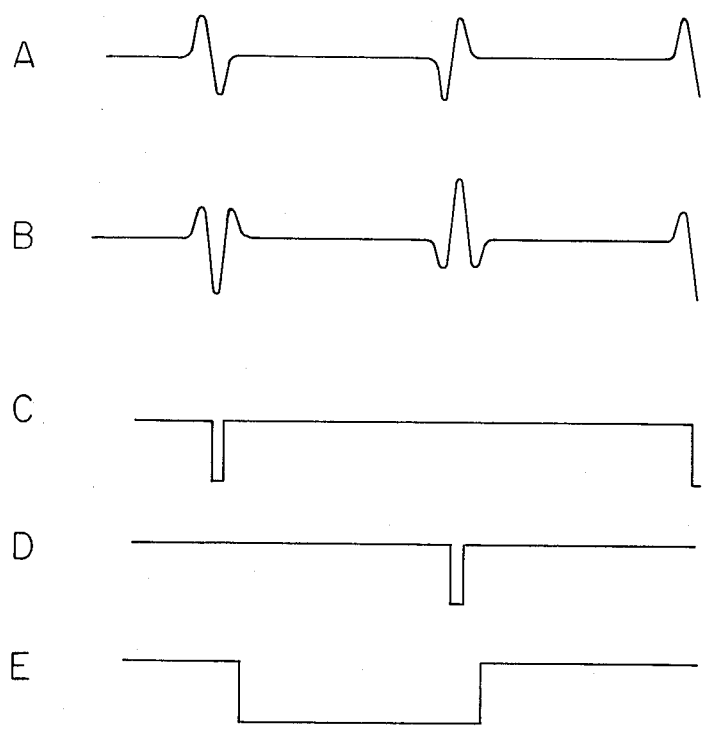
FIG. 10 is a graph showing electrical waveforms appearing at five points in a processing circuit adapted to the apparatus of FIG. 2 for processing the rotational phase detecting signal derived from the apparatus of FIG. 2.
Figure 11:
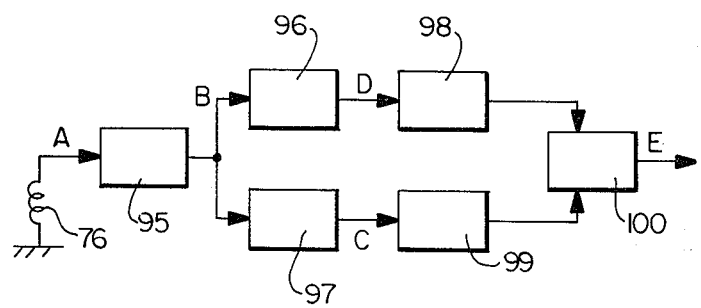
FIG. 11 is an example of a processing circuit in which the electrical waveforms as of FIG. 9 appear.

Referring to FIG. 11, the pulses of FIG. 10A are differentiated and amplified by a differential amplifier 95 in FIG. 11 to become converted to pulses of the form of FIG. 10B. The pulses of FIG. 10B are applied to a first peak detector 96 and a second peak detector 97. The first peak detector 96 detects the peak values of the positive going pulses, and the second peak detector 97 detects the peak values of the negative going pulses of the pulses of FIG. 10B, to produce rectangular pulses of the form of FIGS. 10C and 10D, respectively. Two monostable multivibrators 98 and 99 are triggered by the pulses of FIGS. 10C and 10D, respectively, to produce representing pulses which represent the rotational phases of the two rotary heads 16, respectively. By the thus produced representing pulses, a bistable multivibrator 100 is alternately triggered to produce pulses of the form of FIG. 10E corresponding to the two rotary heads which are fixed to the rotary drum 12 at opposite points at an outer surface of the rotary drum 12, respectively. The thus obtained pulses of FIG. 10E are used as control signals for controlling the rotational phase or angle of the brushless motor, and are also used as switching signals for alternately switching the output signals of the two rotary heads 16.

The rotational phase detecting means as described above does not suffer undesired leakage flux which might appear in a conventional rotational phase detecting means, in which the pulses of FIG. 10E are obtained by a magnetic head and a rotating magnet, because the magnets 78, 80 are stationarily fixed. Therefore, audio noises or video noises which might appear due to leakage flux do not appear in the above rotational phase detecting means.

A signal detecting means 86 for controlling the rotational speed of the brushless d.c. motor will be described below. Referring to FIG. 2, the signal detecting means 86 is placed around the center shaft 18 at a side of the bearing housing 22 which is opposite to the side thereof above which the tape guide member 10 is placed. The signal detecting means 86 comprises a stationary internal gear 88, a rotary external gear 90 having the same number of teeth as that of the teeth of the internal gear 88, a magnet 92 of ring form which is magnetized in the direction of its axis, and a signal detecting winding 94 wound around the magnet 92. The internal gear 88, the magnet 92 and the winding 94 are stationarily supported by the bearing housing 22, and are all coaxial with the center shaft 18 in a manner such that the center shaft 18 is inserted within elements 88, 92, 94. The external gear 90 is coaxially and fixedly mounted on the center shaft 18 so that the teeth of the external gear 90 are positioned perpendicular to the axis of the center shaft 18 on the same plane as the teeth of the internal gear 88 are positioned, without any meshing engagement between these teeth. The magnetic fluxes from the magnet 92 vary with the variation of the relative position between the teeth of the gears 88 and 90. This variation of the magnetic fluxes from the magnet 92 is detected by the winding 94. Since the thus detected signal has a level proportional to the rotational speed of the brushless motor, the rotational speed can be controlled by comparing the level of the detected signal with that of a reference signal.

An example of the process for assemblying the guide drum apparatus as described above will be described below. In the first place, there are prepared the shaft 18 having the rotor 30 fixed thereon, the bearing housing 22, the stationary drum 14 having the position detecting stator 52 mounted thereon, the stator plate 46 having the stationary winding 42 for the rotary transformer 36 and other electrical elements mounted thereon, the rotary magnets 48 mounted on a flat supporting plate, the rotary disc plate 40 having the rotary winding 38 for the rotary transformer 36 mounted thereon, the rotary drum 12 having the rotary heads 16 and the magnetic plates 82, 84, the signal detecting means 86, and other necessary elements. Then, the bearing housing 22 is fixed to the stationary drum 14 by screws 34. Then, the signal detecting means 86 is fixed to the bearing housing 22 by screws, and the external gear 90 is fixed to the center shaft 18. The flat supporting plate of the rotary magnets 48 is then fixed to the rotor 30 by screws. Then, the stator plate 46 is fixed to the stationary drum 14, and the ring-form shield plate 70 is inserted in the stationary drum 14. Thereafter, the rotary disc plate 40 is fixed to the center shaft 18 by screws in a manner such that the distance between the rotary winding 38 and the stationary winding 42 for the rotary transformer 36 equals a predetermined distance. Finally, the rotary drum 12 is fixed to the rotary disc plate 40 by screws.

As will be apparent from the above description, the guide drum apparatus of this invention can be made compact in size and is protected from leakage fluxes without necessitating the use of many shield plates, although elements for a brushless motor are mainly installed in the bore defined by the contiguous hollows of the stationary and the rotary drums, and the motor can directly drive the guide drum apparatus. This is mainly because the stator plate and the rotary magnets are designed to face each other on planes perpendicular to the axis of the center shaft, and the stator plate is designed to be a type of partition wall for separating the elements for a brushless motor from the elements for magnetic recording and/or reproducing, such as the rotary heads and the rotary transformer. Further, the major opposite surfaces of the planar stator plate are effectively used for mounting thereon the armature windings, the stationary winding for the rotary transformer, and a printed cirucit board for communicating electrical signals with both the rotary transformer and the armature windings. Therefore, the number of necessary elements is minimized, and the guide drum apparatus can be inexpensive and can be made by a simple process. The plane-to-plane facing between the armature windings and the rotary windings causes the brushless motor to have a small thickness in the direction of the axis of the rotary shaft, so that the brushless motor can substantially be contained in the hollow of the stationary drum, and thus the brushless motor and the tape guide member can be integrated at one side of the bearing housing. This is also the reason for causing the guide drum apparatus to be compact and accurate in its rotation. As to the rotational phase detecting means, it is protected from leakage flux because the magnets therein are stationarily fixed.

While particular embodiments of the invention have been shown and described, it will be obvious to those skilled in the art that changes and modifications may be made without departing from the invention in its broader aspects and, therefore, the appended claims are intended to cover all such changes and modifications as fall within the true spirit and scope of the invention.

What is claimed is:

1. A guide drum apparatus in a magnetic recording and/or reproducing apparatus, comprising:
   a rotary center shaft;
   a hollow cylindrical rotary drum coaxially fixed to said center shaft and having a cylindrical outer surface;
   a rotary head fixedly supported to rotate with said center shaft at a hollow cylindrical outer surface of said rotary drum;
   a hollow cylindrical stationary drum coaxially and rotatably supporting said center shaft and having a cylindrical outer surface, said cylindrical outer surfaces of said rotary drum and said stationary drum being positioned on a same cylindrical surface and spaced from each other by a gap, said rotary head being positioned at said gap, and the hollows of said rotary drum and said stationary drum facing each other to thereby form a bore;
   a stator plate of a magnetic material fixed to said stationary drum and having a major plane surface perpendicular to the axis of said center shaft;
   stationary armature windings fixed to said major plane surface of said stator plate and equidistantly positioned on a circle defined on said stator plate, the center of said circle coinciding with the axis of said center shaft;
   a rotary winding, for a rotary transformer, fixedly supported by said center shaft at a side facing a surface of said stator plate opposite to said major plane surface of said stator plate, and electrically connected to said rotary head;
   a stationary winding, for said rotary transformer, fixedly supported by said stationary drum at a position between said rotary winding and the surface of said stator plate opposite to said major plane surface of said stator plate, said stator plate thus functioning also as a shield plate for reducing magnetic coupling between said rotary transformer and said armature windings and also between said rotary head and said armature windings; and
   rotary magnets fixedly supported by said center shaft and equidistantly spaced on a circle which is defined on a plane parallel to and facing said major plane surface of said stator plate and which has a center coinciding with the axis of said center shaft, so that said armature windings face said rotary magnets to cause said rotary magnets to rotate by the magnetic fluxes produced from said armature windings, wherein all of said rotary transformer, said armature windings and said rotary magnets are contained in said bore.

2. A guide drum apparatus according to claim 1, wherein said rotary head is fixed to said rotary drum.

3. A guide drum apparatus according to claim 1, which further comprises a rotary disc plate positioned in said bore and fixed to said center shaft, said rotary winding being fixed to said rotary disc plate.

4. A guide drum apparatus according to claim 1, wherein said stationary winding for said rotary transformer is fixed to said stator plate.

5. A guide drum apparatus according to claim 1, wherein each of said rotary magnets is a permanent magnet.

6. A guide drum apparatus according to claim 1, which further comprises a rotational angle representing element positioned in said bore and fixed to said rotary drum for representing the rotational angle of said rotary drum, wherein said stator plate has a sensing element fixed thereto at a position facing the path of rotational movement of said rotational angle representing element and opposite to said major plane surface of said stator plate for sensing the rotational speed of said rotational angle representing element.

7. A guide drum apparatus according to claim 6, wherein said rotational angle representing element comprises a pair of magnetic plates arranged on a single line perpendicular to and passing through the axis of said center shaft, and said sensing element comprises a pair of magnets and a sensor winding positioned between said pair of magnets in a manner such that all of said sensor winding and said pair of magnets are arranged on a single line extending perpendicularly from the axis of said center shaft, and that said pair of magnets face the moving paths of said pair of magnetic plates, respectively.

8. A guide drum apparatus according to claim 1, which further comprises a flat supporting plate fixedly and coaxially supported by said center shaft in said bore and having a supporting surface perpendicular to the axis of said center shaft for supporting said rotary magnets.

9. A guide drum apparatus according to claim 8, which further comprises a rotor coaxial with and fixedly mounted on said center shaft in said bore for supporting said flat supporting plate.

10. A guide drum apparatus according to claim 9, wherein said rotor has a projection at an outer peripheral surface thereof, and the guide drum apparatus further comprises a position detecting stator having a winding thereon and being arranged at a position in said bore and outside a circle defined by the rotational path of said rotor so that said position detecting stator can be magnetically coupled to said projection of said rotor for detecting the rotational position of said rotor, and the magnetic couplings between said winding of said position detecting stator and each of said rotary head and said rotary transformer is reduced by said stator plate.

11. A guide drum apparatus according to claim 1, which further comprises a rotor coaxial with and fixedly mounted on said center shaft in said bore for supporting said rotary magnets.

12. A guide drum apparatus according to claim 1, which further comprises a bearing housing which is fixed to said stationary drum at an end portion of said bore in a manner such that said bearing housing is coaxial with said center shaft for thereby supporting said center shaft.

* * * * *